Figure 1:
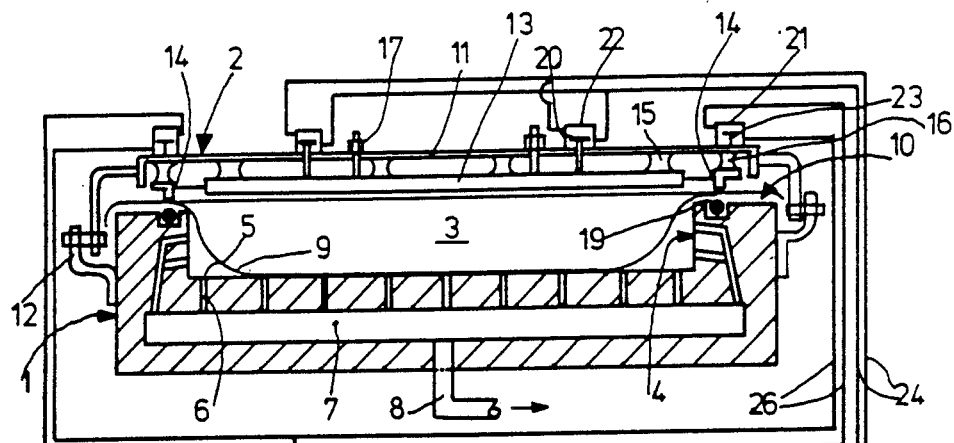

United States Patent [19]

Onnenberg et al.

[11] Patent Number: 4,971,541
[45] Date of Patent: Nov. 20, 1990

[54] APPARATUS FOR THE PRODUCTION OF UPHOLSTERY WITH BACKFOAMED COVERS, IN PARTICULAR FOR SEATS IN MOTOR CARS

[75] Inventors: Volker Onnenberg, Wiehl; Günter Möllmann, Hagen, both of Fed. Rep. of Germany

[73] Assignees: Fritsche-Mollmann GmbH, Lotte; Bayer Aktiengesellschaft, Leverkusen, both of Fed. Rep. of Germany

[21] Appl. No.: 425,908

[22] Filed: Oct. 24, 1989

Related U.S. Application Data

[62] Division of Ser. No. 100,505, Sep. 24, 1987, abandoned.

[30] Foreign Application Priority Data

Oct. 4, 1986 [DE] Fed. Rep. of Germany ....... 3633922

[51] Int. Cl.⁵ .................. B29C 51/10; B29C 67/20
[52] U.S. Cl. ............................ 425/111; 249/93; 249/95; 264/46.8; 425/117; 425/125; 425/388; 425/DIG. 48
[58] Field of Search .............. 425/111, 116, 117, 125, 425/388, 553, DIG. 48, DIG. 29, 4 R, 817 R, 112; 249/93, 94, 95; 264/46.8, 46.4, 46.5, 46.7, 46.6

[56] References Cited

U.S. PATENT DOCUMENTS

| 2,666,951 | 1/1954 | Grove et al. | 425/DIG. 48 |
| 3,943,215 | 3/1976 | Grune et al. | 264/46.8 |
| 4,137,030 | 1/1979 | Sanson | 425/388 |
| 4,239,472 | 12/1980 | Atkinson et al. | 425/DIG. 48 |
| 4,552,522 | 11/1985 | Van Melle | 425/388 |

FOREIGN PATENT DOCUMENTS

| 3633919 | 10/1986 | Fed. Rep. of Germany . |
| 2274441 | 1/1976 | France . |
| 648521 | 11/1962 | Italy | 425/388 |
| 61-104822 | 5/1986 | Japan | 425/388 |
| 61-235111 | 10/1986 | Japan | 264/46.8 |

Primary Examiner—Jay H. Woo
Assistant Examiner—Khanh P. Nguyen
Attorney, Agent, or Firm—Joseph C. Gil

[57] ABSTRACT

The present invention relates to an apparatus for the production of back-foamed products. The apparatus broadly consists of two mold halves, a stretching frame attached to one of the mold halves, and a pulsator device for applying pulsations to the edge region of the mold cavity.

4 Claims, 2 Drawing Sheets

APPARATUS FOR THE PRODUCTION OF UPHOLSTERY WITH BACKFOAMED COVERS, IN PARTICULAR FOR SEATS IN MOTOR CARS

This application is a division, of application Ser. No. 100,505 filed Sept. 24, 1987 now abandoned.

BACKGROUND OF THE INVENTION

The present invention relates to a process and to an apparatus for the production of back-foamed products and in particular, upholstery with back-foamed covers, particularly for seats in motor cars. In the process, a piece of material for the cover is placed on a mold half and pressed against the edge of the mold cavity. A vacuum is then applied to the cavity, and the material is sucked into the cavity against the pressure acting on it and is fitted to the contour of the cavity. A foamable reaction mixture is then introduced into the mold cavity and the complete seat cushion is removed when the foam has hardened.

In order to produce a piece of upholstery with visually perfect contours, it is important to ensure that when the material for the cover is sucked into the mold cavity by the vacuum, it is placed into position in such a manner that it is either free from folds or has predetermined folds in particular positions. This necessitates controlled sliding of the cover into position. This sliding control is obtained by using a stretching frame which exerts sufficient force to press the material for the cover against the edge of the lower mold half surrounding the mold cavity.

It has already been attempted to control this sliding movement of the cover under the frame by means of a film of air under pressure (German Patent 3,034,973). This method has not always been found satisfactory in practice and difficulties occur particularly if the material of the cover is not stretchable.

The problem lies in improving the control of the contact pressure acting on the material of the cover as it slides over the edge surrounding the mold cavity so that the material will slide into position to fit firmly against the wall of the cavity at every point.

BRIEF DESCRIPTION OF THE INVENTION

Figure 2:
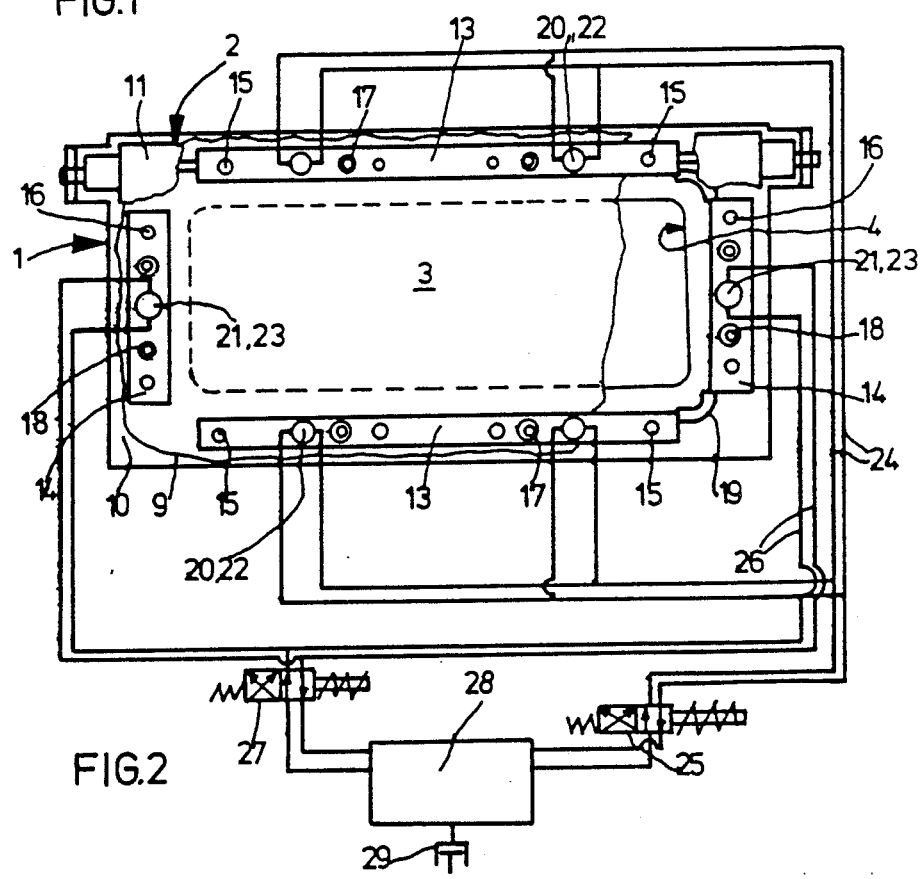
Figure 3:
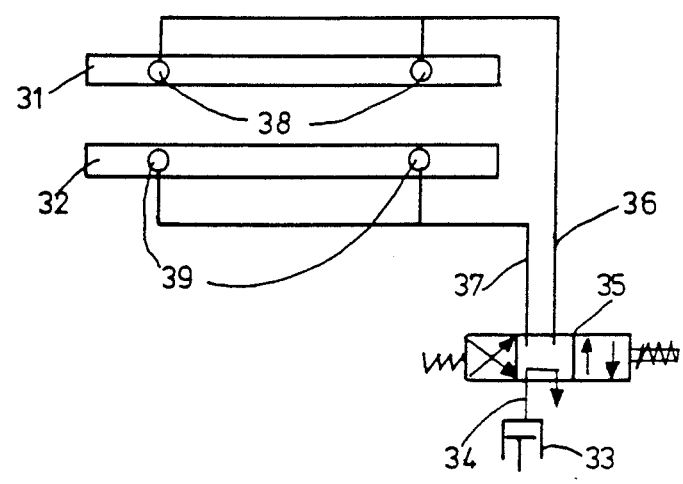

FIG. 1 shows a section through the apparatus,
FIG. 2 is a top plan view of the apparatus and
FIG. 3 is a top plan view of a modification with stretching bars arranged in parallel.

DESCRIPTION OF THE INVENTION

The above problem is solved by subjecting the contact pressure acting on the material to a pulsation. This measure has the advantage that the pulsating pressure is repeatedly applied to and released from the cover material as the material slides into position. Any unwanted formations of folds or creases are therefore prevented as soon as they arise. Folds that are necessary (in particular, those produced at the corners if the material of the cover is not stretchable) are formed in a reproducible manner.

The invention thus relates to novel process and apparatus. More particularly, the invention is directed to an improved process for the production of back-foamed products comprising
(i) placing a covering material over a mold cavity such that said material completely covers said cavity and extends beyond the edge of said cavity,
(ii) applying contact pressure to said edge to control sliding of said material,
(iii) applying a vacuum to said cavity thereby sucking said material into said cavity and fitting said material to the contours of said cavity,
(iv) introducing a foamable mixture into said cavity and on top of said material, and
(v) removing the resultant product after the foamable mixture has reacted and/or hardened, the improvement wherein said contact pressure is subjected to pulsation.

The frequency of pulsation to be applied depends in particular on the properties of the cover material such as stiffness, stretchability and ease of sliding. The pulsation is preferably applied at a frequency of 20 to 400 vibrations per minute. This range should be suitable for most types of covers. Excellent results would normally be expected to be obtained with pulsations at a frequency of 35 to 200 per minute. It is a simple matter to carry out tests to determine the optimum pulsation frequency for each individual case.

According to one particular embodiment, the pulsation acts only at isolated points. This method is advantageous if difficulties in fitting the covering material occur only at specific points over the circumference of the mold cavity, as for example at the corners of upholstery designed to be used for seats.

The contact pressure applied preferably varies over the periphery of the mold. This measure in cooperation with the application of suitable pulsation frequencies also serves to improve the introduction of the cover into the mold at particularly critical points.

It may be advantageous to vary the pulsation frequency and/or the contact pressure in the course of the process of introducing the cover.

It goes without saying that the result of the process, i.e. the finished article of upholstery, must be reproducible in its external appearance since such upholstery articles are generally produced in a series as standard fittings. The contours must therefore conform to the standard article.

The apparatus for producing upholstery with back-foamed covers (in particular upholstery for motor car seats) is based on a mold with mix head. At least one half of the mold has a suction opening in its wall connected to a source of vacuum. This half of the mold is equipped with a stretching frame which can be placed on it for the cover material which is to be inserted into the mold cavity. The novelty of the arrangement is that a pulsator is associated with the stretching frame.

Substantially any type of pulsator may be used. Pulsators with a revolving imbalance are advantageously used if pulsation is to be exerted only at certain points. If pulsation is required over the whole circumference of the cavity, it is suitable to apply pulsation by pneumatic or hydraulic means (for example, by providing several pulsation elements in the form of cylinder and piston units distributed over the circumference).

The stretching frame preferably does not itself pulsate but consists of a supporting frame having at least one stretching bar yieldingly connected with it. The pulsator acts on this bar at least at one point. This provides a particularly convenient arrangement for the interplay of contact pressure with pulsation.

The stretching bar is preferably composed of several sections. This is advantageous because a single revolving stretching bar would have to be manufactured to a very high degree of accuracy in order to produce either the same contact pressure at every point or the desired differences in contact pressure. These conditions are more easily fulfilled by providing several sections. For example, in the regions of the corners where folds must be formed, the stretching bar would have to be placed at a greater distance or even completely omitted. Alternatively, it may have recesses serving as guides for the formation of the folds.

According to another particular embodiment, a separate pulsator is provided for at least two sections. This enables the various sections to be subjected to different pulsations and is particularly advantageous if different quantities of cover material have to be pulled along per unit time at different points.

In one particularly advantageous embodiment, spring elements (at least partly differing in their rigidity) are placed between the supporting frame and the stretching bar over the circumference of the mold cavity. In certain cases it may be quite satisfactory to use spring elements which all have the same rigidity. The spring elements may be helical springs or rubber springs. By using spring elements with different rigidities it is possible to apply "hard" pulsations at some points and "soft" pulsations at other points.

According to another particular embodiment, several stretching bars are arranged in parallel. The sliding movement of the cover can thereby be more easily influenced. The parallel stretching bars are preferably subjected alternately to pulsations. The sliding movement is thereby subdivided not only in time but also in space into the smallest possible intervals. The stretching bar which is closest to the mold cavity will thus allow only so much cover material to slide into position as has previously been released by the more outwardly situated bar. The distance between the parallel stretching bars may be of some influence on the process and is therefore preferably adjustable.

An elastic seal conforming to the stretching frame or stretching bar is preferably provided in the plane of separation of the lower half of the mold. This arrangement enables the cover material to be firmly pressed against the seal during the pressure phases of the pulsation so that during this interval the material is so firmly held down by the frame that at that moment only the quantity of material previously released can slide into the mold cavity.

The new apparatus is also applicable with suitable modifications to foam molding plants such as circular tables or revolving installations. In such foam molding plants, one or several steps of the process are carried out at particular stations. Thus, for example, insertion of the cover material may be carried out in a first station, introduction of the reaction mixture in a second station, closing of the mold in a third station, curing in a fourth station and removal of the finished article from the mold in a fifth station.

An exemplary embodiment of the new apparatus is illustrated purely schematically in the drawing and is described below. The upper mold half and the mix head for introducing reaction mixture have been omitted from the drawing for the sake of greater clarity and because they are in any case well known.

A stretching frame 2 is placed on a lower mold half 1. The lower mold half 1 contains a mold cavity 3, the wall 4 of which has suction openings 5 which are connected to a vacuum chamber 7 through channels 6. The vacuum chamber 7 is connected to a vacuum reservoir (not shown) through an intake pipe 8. The stretching frame 2 lies on the edge 10 of the mold cavity 3 with a section of material 9 placed between them. This edge 10 constitutes the plane of separation of the mold. The stretching frame 2 consists of a supporting frame 11 which is attached by hinges 12 to the mold half 1. Stretching bars 13,14 are connected to the supporting frame 11 by spring elements 15,16 (or rubber springs). Adjustable stop pins 17,18 limit the stroke of pulsation of the stretching bars 13,14 in the direction of the surrounding edge 10. An elastic seal 19 in the edge 10 is associated with the stretching bars 13,14. The bars 13,14 carry pistons 20,21 in cylinders 22,23. The cylinders 22 are connected to a pressurized air tank 28 through a collecting pipe 24 and a 4-way valve 25 while the cylinders 23 are connected to the tank 28 through a collecting pipe 26 and a 4-way valve 27. The tank is fed from a compressor 29. The 4-way valves 25,27 can be electromagnetically switched at differing frequencies. The spring elements 15,16 differ in their hardness. The stop pins 17,18 are adjusted to different stroke heights.

FIG. 3 shows two stretching bars 31,32 arranged at an adjustable distance parallel to one another. A pipe 34 leads from a source of pressurized air 33 (existing pressurized air supply) to an electromagnetically operated, so-called 4/3-way valve 35 with restoring spring. Two collecting pipes 36,37 extend from this valve to cylinder and piston units 38,39. The 4/3-way valve 35 is so designed that its pulsating switching on and off acts alternately on the cylinder and piston units 38 and 39 so that pressure is exerted by the stretching bar 31 while the bar 32 is relaxed and conversely.

In practice, one process of using the apparatus of FIGS. 1 and 2 is as follows:

With the stretching frame 2 raised, a piece of fabric 9 consisting of velour sealed at the back is placed over the edge 10 and mold cavity 3. The stretching frame 2 is lowered and locked. The stretching bars 13 exert less pressure on the material than the stretching bars 14 as their spring elements 15 are softer than the spring elements 16. A vacuum is then applied to the mold cavity 3 and the stretching bars 13,14 are pulsated by operating the 4-way valve 25 at a frequency of 50 switching operations per minute and the 4-way valve 27 at a frequency of 70 switching operations per minute. The stretching bars 13 therefore pulsate at 50 vibrations per minute while the stretching bars 14 at 70 vibrations per minute. With each stroke, a fresh portion of cover material slides into position by the vacuum of 0.3 bar applied to the mold cavity 3. In the intervals between each stroke, the cover material 9 is immediately pressed against the elastic seal 19 by the bars 13,14 so that not only is the sliding movement momentarily stopped but the intake of additional air is prevented. As the cloth is pulled in, the folds are formed in the desired manner at the free corners between the stretching bars 13,14. If necessary, the formation of folds may be assisted by a push-rod so that the folds will be placed firmly against the wall 4 at the corners. When the cover material 9 has been tightly fitted against the wall 4 at every point, the pulsations are switched off. At the same time, the vacuum is maintained so that the bars 13,14 continue to press the material 9 against the edge 10. A mix head (not shown) is swung over the mold cavity 3 and a predetermined quantity of a reaction mixture forming a flexible polyurethane foam is introduced. The mixing head is subsequently removed and the mold is closed by the upper mold half being placed on the edge 10 left between the mold cavity 3 and the stretching frame 2.

The vacuum is stopped at the latest at the stage when the reaction mixture has foamed up and hardened to form a flexible foam which adheres firmly to the back of the cover material. The upper mold half is then removed, the stretching frame 2 is raised and the finished product is removed. The material of the cover may have to be trimmed to remove excess round the edges. The apparatus is now ready for the next production of an upholstery article.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An apparatus for the production of back-foamed products comprising:
    (1) a mold comprising a mix head, an upper mold half and a lower mold half, said halves capable of moving towards and way from each other, wherein
        (i) said lower mold half has an edge surrounding a mold cavity, and said edge defines a plane of separation of said mold halves,
        (ii) said lower mold half has suction openings in the wall thereof which are connected to a source of vacuum,
    (2) a stretching frame adapted to cooperate with said edge, said stretching frame comprising:
        (i) a supporting frame, and
        (ii) at least one stretching bar connected to said frame by a yielding spring connection, said stretching bar capable of applying pressure to said edge, and
    (3) a pulsator means attached to said supporting frame for applying pulsations to said bar.

2. The apparatus of claim 1, wherein said stretching bar comprises two or more sections.

3. The apparatus of claim 2, wherein separate pulsator means are attached to said supporting frame for applying different pulsations to said two or more sections.

4. The apparatus of claim 1, wherein said yielding spring connection includes spring elements which at least partly differ in their rigidity, said spring elements being arranged round the circumference of said mold cavity between said supporting frame and said stretching bars.

* * * * *